US005922240A

United States Patent [19]
Johnson et al.

[11] Patent Number: 5,922,240
[45] Date of Patent: Jul. 13, 1999

[54] DEICING COMPOSITION AND METHOD

[75] Inventors: Jeffrey A. Johnson; Lawrence W. Pratt, both of Lyndonville, N.Y.

[73] Assignee: Ice Ban USA, Inc., North Palm Beach, Fla.

[21] Appl. No.: 08/891,841

[22] Filed: Jul. 14, 1997

Related U.S. Application Data

[63] Continuation-in-part of application No. 08/555,008, Nov. 9, 1995, abandoned.

[51] Int. Cl.$^6$ ....................................................... C09K 3/18
[52] U.S. Cl. .......................... 252/70; 106/13; 106/14.11; 106/14.44
[58] Field of Search .................................. 252/70; 106/13, 106/14.11, 14.44

[56] References Cited

U.S. PATENT DOCUMENTS

| | | | |
|---|---|---|---|
| 1,581,179 | 4/1926 | Crofoot | 252/73 |
| 3,489,596 | 1/1970 | Plump | 427/408 |
| 3,897,348 | 7/1975 | Atkinson | 510/521 |
| 3,976,581 | 8/1976 | Rose | 424/70 |
| 4,106,487 | 8/1978 | Randall et al. | 127/23 |
| 4,259,640 | 3/1981 | della Faille d'huysse et al. | 324/439 |
| 4,277,411 | 7/1981 | Yahl | 554/15 |
| 4,283,297 | 8/1981 | Peters et al. | 252/70 |
| 4,359,528 | 11/1982 | Devos et al. | 435/43 |
| 4,430,240 | 2/1984 | Sandvig et al. | 252/70 |
| 4,440,792 | 4/1984 | Bradford et al. | 426/271 |
| 4,486,458 | 12/1984 | Bradford et al. | 426/618 |
| 4,585,571 | 4/1986 | Bloom | 252/70 |
| 4,587,027 | 5/1986 | Preusch et al. | 252/73 |
| 4,588,512 | 5/1986 | Rippie | 252/70 |
| 4,664,832 | 5/1987 | Sandvig et al. | 252/70 |
| 4,676,918 | 6/1987 | Toth et al. | 252/70 |
| 4,746,449 | 5/1988 | Peel | 252/70 |
| 4,824,588 | 4/1989 | Lin | 252/70 |
| 4,937,104 | 6/1990 | Puhringer | 427/344 |
| 4,953,360 | 9/1990 | Rzechula | 252/70 |
| 4,980,282 | 12/1990 | de Troostembergh et al. | 435/43 |
| 5,067,982 | 11/1991 | Caransa et al. | 426/463 |
| 5,089,052 | 2/1992 | Ludwig | 106/276 |
| 5,135,674 | 8/1992 | Kuhajek et al. | 252/70 |
| 5,283,322 | 2/1994 | Martin et al. | 530/374 |
| 5,302,307 | 4/1994 | Ireland | 252/70 |
| 5,324,442 | 6/1994 | Mathews | 252/70 |
| 5,366,650 | 11/1994 | Wiesenfeld et al. | 252/70 |
| 5,376,292 | 12/1994 | Lucas | 252/70 |
| 5,563,069 | 10/1996 | Yang | 435/295.3 |
| 5,645,755 | 7/1997 | Wiesenfeld et al. | 252/70 |

FOREIGN PATENT DOCUMENTS

| | | |
|---|---|---|
| 2135662 | 5/1996 | Canada . |
| 0221269 | 8/1986 | Germany . |
| 3733080 | 9/1987 | Germany . |
| WO8703293 | 6/1987 | WIPO . |

OTHER PUBLICATIONS

PCT International Search Report completed Apr. 28, 1997 for PCT/US97/01008.
PCT International Search Report completed Jul. 4, 1997 for PCT/US97/04440.
PCT International Search Report comleted Jul. 4, 1997 for PCT/US97/04374.

*Primary Examiner*—Anthony Green
*Attorney, Agent, or Firm*—Baker & Botts, L.L.P.

[57] ABSTRACT

Disclosed is a new and improved, environmentally acceptable and negligibly corrosive deicing composition comprising brewers' condensed solubles produced, for example, as by-products from a commercial beer brewing process, which by-products are biodegradable. The invention also relates to the use of a deicing composition to reduce the buildup of snow and ice on roads, bridges and other outdoor surfaces.

25 Claims, No Drawings

DEICING COMPOSITION AND METHOD

REFERENCE TO RELATED APPLICATIONS

This patent application is a continuation-in-part of a U.S. patent application Ser. No. 08/555,008 filed Nov. 9, 1995 and now abandoned.

FIELD OF THE INVENTION

The present invention is directed to deicing compositions comprising brewers' condensed solubles ("BCS"). Such compositions are useful for deicing outdoor surfaces, as antifreezes and as fertilizers as the compositions are environmentally acceptable and negligibly corrosive. The invention also relates to methods for reducing the accumulation of snow and ice on outdoor surfaces such as roads, bridges, runways and taxiways utilizing the compositions of the invention.

BACKGROUND OF THE INVENTION

It is well known that the ice and snow located on roads and bridges significantly slow traffic and pose increased danger to the general public. Mechanical snow removal is often used to alleviate some of the traffic problems. It is also known that chemical compounds, such as chloride salts, whether in solid form or in solution or in admixture with sand and other substances, are often used to treat the roadways to melt snow and ice. Most deicing compounds, however, are environmentally harmful, and therefore, municipalities are often restricted in the amounts and types of substances that they may use to help control the buildup of snow and ice.

Most chemicals used to treat roadways are detrimental for the following reasons: They damage the soil and surrounding vegetation by turning the soil alkaline and damaging the root systems of the plants; They damage freshwater streams, rivers and lakes and are often absorbed into underground water systems; and, The chemicals cause significant damage to vehicles, as well as concrete and metallic structures that are near roadways because of the corrosive effects of said chemicals. It is well known that many salts cause spailing in concrete structures, which significantly reduce the strength and life of such structures. For the foregoing reasons, many states have banned the use of salts and other chemicals, while others have placed significant restrictions on their usage.

It is known that it is desirable to replace the corrosive salts with non-corrosive substances, such as alcohols and glycols, but because of their flammability, toxicity and expense, these other substances have not been effectively and economically utilized to date. Therefore, a need has arisen for a minimally corrosive, environmentally acceptable, cost-effective, deicing composition.

SUMMARY OF THE INVENTION

The present invention overcomes the problems and disadvantages associated with current deicing compositions and provides compositions and methods that are minimally corrosive, environmentally acceptable and cost effective. The compositions of the invention cause little or no corrosion to surrounding metal objects or vehicles, nor do the compositions damage the environment as would chloride salts and other chemicals. The compositions are also biodegradable and environmentally friendly and can be utilized as fertilizers.

The present invention is directed to environmentally acceptable deicing compositions that comprise BCS. BCS are by-products of a brewing process of grains to create brewed beverages, such as beer. BCS are water soluble, negligibly corrosive, inexpensive and widely-available in large quantities, and may be made from any number of grains, including without limitation, corn, wheat and barley. The present invention is also directed to the use of said deicing composition to keep roads, bridges, runways taxiways and other outdoor surfaces free of ice and snow. The present invention is also corrosion- inhibiting and acts as a fertilizer. Deicing compositions of the invention can be used prophylactically to prevent the accumulation of snow and ice to a surface and to reduce or eliminate snow and ice subsequent to their accumulation.

In another embodiment, a method for inhibiting corrosion of a surface exposed to a corrosive substance may comprise applying a composition containing BCS to said surface. In yet another embodiment, a method for reducing the corrosive effects of a deicing salt may comprise adding BCS to said corrosive salt.

Preferably, deicing compositions have suitable water solubility, have a low freezing temperature in solution, are availability on an industrial scale at a low or acceptable costs, are low or minimally corrosive, are environmentally acceptable, and are capable of being applied by conventional generally known and available means.

In view of the foregoing, it is a primary object of the present invention to provide a deicing composition suitable for making surfaces free of snow and ice, which composition is water soluble, has a low freezing temperature, is cheaply and readily available in large industrial quantities throughout the world, is negligibly corrosive, is environmentally friendly, and is capable of being applied with currently available equipment and by existing crews.

A related object of the present invention is to provide an environmentally friendly, negligibly corrosive deicing composition at a cost-competitive price.

Yet another object of the present invention is to provide an environmentally friendly, negligibly corrosive deicing composition that can be used in admixtures with sand, river gravel, cinders, sawdust, or other skid-reducing, manufactured grit and subsequently applied to roads, bridges, runways, taxiways and other surfaces where it is desirable to keep said surfaces free of snow and ice.

Another object of the present invention is to provide an environmentally friendly deicing composition that can be used to pretreat roads, bridges and other outdoor surfaces prior to the accumulation of snow and ice to prevent the adherence of snow and ice to said surfaces.

To Yet another object of the present invention is to provide an environmentally friendly, negligibly corrosive deicing composition that can be used in admixtures or mixtures with other chemical deicing agents and/or skid-reducing chemical agents and subsequently applied to roads, bridges, runways, taxiways, and other surfaces where it is desirable to keep said surfaces free of snow and ice.

Another object of the present invention is to provide a process for making roads, bridges, runways, taxiways and other outdoor surfaces free of ice and snow, which process comprises applying the deicing composition of the present invention onto such surfaces prior to ice or snow, either by itself, or in mixture or admixture with chemical deicing or other skid-reducing additives.

Another object of the present invention is to provide a corrosion-inhibiting composition. Said composition can be used in combination with chloride salts and other corrosive substances to reduce their harmful effects to the environment.

Another object of the present invention is to provide a fertilizer which can be used to help prevent the accumulation of snow and ice on plants.

Another object of the present invention is to provide a method of fertilizing plants in a manner which helps prevent the accumulation of snow and ice thereon.

Other embodiments and advantages of the invention are set forth, in part, in the description which follows and, in part will be obvious from this description or may be learned from the practice of the invention.

DESCRIPTION OF A PREFERRED EMBODIMENT

As embodied and broadly described herein, the present invention is directed to a composition comprising brewers' condensed solubles ("BCS") and to methods for applying and utilizing BCS to prevent or reduce the accumulation of snow and ice on outdoor surfaces and as an anti-freeze.

The deicing composition of the present invention is a by-product of a brewing process for creating brewed beverages, such as beer. A typical brewing process involves the fermentation of a carbohydrate containing substrate (such as wort or grape juice) with a microorganism (such as a yeast). A conventional process for brewing beer comprises fermenting wort with a suitable species of yeast, such as *Saccharomyces cerevislae* or *Saccharomyces carlsbergensis*, wherein the fermentation is usually effected in two steps: a first fermentation period for approximately seven to ten days; and a secondary fermentation period which may take as many as three to twelve weeks. During the first fermentation period, most of the carbohydrates in the wort are converted to ethanol and carbon dioxide. The second fermentation period, also known as the "maturation process," occurs at a low temperature in the presence of a small residual amount of yeast. Additional information regarding conventional beer brewing processes can be found in U.S. Pat. No. 5,612,072, issued Dec. 21, 1992, to Lommi et al.

Thereafter, the brewed beverage can be poured off, leaving behind a residue of yeast, unfermented wort and other solubles. This residue contains solubles which, after the residue is evaporated and/or dried, are typically recovered for use as nutritional additives in feeds for livestock. Although drying is possible, BCS can be utilized in the form obtained from the brewing process or dried to a water content of less than about 50%, by weight, preferably less than about 25%, more preferably less than about 10% and even more preferable less than about 5%. For example, the composition of the present invention may comprise from about 2 to 50% by weight of brewers' condensed solubles and from about 98 to 50% by weight of water. Essentially dry BCS with a water content of about 1–2% may be preferable for economical transport though a composition with greater liquid content may be preferable for economical application of the compositions of the invention. Typically, before any drying, the residue contains between 10% and 30% solubles. By drying, the ratio may be adjusted to any desirable level.

While the process above is described below in connection with beer, it is to be understood that BCS can be created as a byproduct of various other brewing processes using a variety of carbohydrate rich materials.

Accordingly, deicing compositions of the invention may comprise by weight less than 100% BCS, preferably between about 3% to 95% by weight of BCS in admixture with between about 5% to about 97% water, and more preferably from about 14 to about 80% by weight of BCS in admixture with between about 20 to about 86% by weight of water. Compositions may be further admixed with optional additives such as skid-reducing agents and conventional deicing and anti-freeze compositions. For example, skid reducing agents include sand, gravel such as river gravel, manufactured grit, cinders, sawdust, or other organic, non-organic and synthetic materials. Conventional anti-freeze compositions include, for example, glycols such as ethylene glycol, diethylene glycol, propylene glycol, dipropylene glycol and glycol monoethers. These and other anti-freeze compositions contain water and water-soluble liquid alcohol freezing point depressants and are well known to those of ordinary skill in the art. The percentage by weight of BCS and the percentage by weight of any accompanying liquid varies with the needs of the user. For example, the range of about 14% to about 80% by weight of BCS in admixture with about 20% to about 86% by weight of liquid is preferable when the composition is to be sprayed upon a surface. A range of about 86% to about 97% by weight of BCS in admixture with about 3% to about 14% liquid is preferable when a dryer composition is desired, for example, when the deicing composition is to be applied with a shovel or truck-mounted spreader.

The compositions of the present invention are excellently suited to serve as deicers which are compositions that reduce or prevent the accumulation of freezing precipitation. Deicing compositions also include anti-freeze compositions which are added to another composition to reduce the freezing temperature or prevent the freezing of that solution. Compositions of the invention preferably have both deicing and anti- freeze properties.

Deicing composition of the invention can be applied to road surfaces prior to the accumulation of snow and ice, which application will help prevent the snow and ice from adhering to the road surfaces. Subsequent to the accumulation of snow and ice, the deicing composition of the present invention is again applied, but this time to reduce the accumulated freezing precipitation such as snow and ice. The two-step application facilitates removal of the accumulated snow and ice by plows and other mechanical methods.

In some applications, it is desirable that the composition of the present invention be mixed or admixed with chloride salts, and possibly calcium magnesium acetate and urea (though the addition of chloride salts, depending on its concentration, may degrade the low corrosiveness and the environmentally friendliness of the present invention). Deicing compositions of the invention also serve as a corrosion inhibiting agents when mixed with chloride salts. The corrosive effects of an admixture of the composition of the present invention with five percent by weight of chloride salts is significantly less than, for example, an admixture of 95 percent water and five percent salts. Thus, the composition of the present invention can be effectively mixed with small amounts of salt without significantly affecting the other characteristics of the composition and, in fact, synergistically to reduce the corrosive effects of the added salt.

According to a further aspect of the present invention, a process for making road surfaces free of snow and ice is provided, said process comprising the application of the composition of the present invention onto the road surfaces prior to icing or snow accumulation. The composition may be preferably applied onto the road surface from moving vehicles in an amount of about 20 to about 60 gallons per lane mile (GPLM), which is about 200 to about 600 pounds per lane mile, which is also equivalent to about 0.48 to about 1.44 ounces per square yard. The composition may also be applied after snow and ice has accumulated in order to melt said snow and ice.

BCS are also safe and possess no undue hazards to humans, animals or the environment from the handling, storing, or use of BCS even when concentrated. BCS are currently used as a low grade animal feed additive or for other low value uses.

According to a further embodiment of the present invention, a method for inhibiting corrosion of a surface exposed to a corrosive substance may comprise applying a composition containing BCS to said surface. Such corrosive substances include sodium chloride, calcium chloride, potassium chloride, magnesium chloride and combinations thereof. When such salts are to be applied, the corrosive effects of said salts may alternatively be reduced by adding BCS to said salts. In one embodiment, the method may comprise applying a composition of said salt with about 5% to about 75% by weight of BCS.

The composition of the present invention can also be cost effectively utilized by airports to prevent the accumulation of snow and ice on runways and taxiways. Many airports today use glycols for deicing an airplane's wings and stabilizers, for which the airports pay sewage treatment processing fees for treatment of the runoff. Such fees can range up to $3.00 per gallon of glycol-contaminated water. Compositions of the invention can be used to replace the use of glycol for these purposes. The elimination of glycol is better for the environment and avoids the need for processing glycol contaminated water, which process demands rigid and costly quality control techniques. In addition, BCS, being relatively non-corrosive (as compared to water), are not harmful to structures, working engines or their component parts such as turbine or propeller blades. When present, solubles can be removed by rinsing with water or other mild soaps or detergents without damage to the structure. Alternatively, solubles are nearly completely vaporized by burning and incineration.

The following examples illustrate embodiments of the present invention, but should not be viewed as limiting the scope of the invention.

EXAMPLES
BCS Formed from a Commercial Beer Brewing Process

BCS are commonly formed as byproducts from commercial beer brewing processes. Though the actual composition of BCS so formed varies from batch to batch, and depends upon the grains, hops, and yeasts used in the process, BCS concentrate derived from a commercial beer brewing process typically has a partial composition as follows:

| ITEM | BCS (48% solids/52% Moisture) |
| --- | --- |
| carbohydrates | 20–60% |
| protein | 5–25% |
| fat | 1–5% |
| crude fiber | 2–5% |
| calcium | 0.1–1.0% |
| phosphorus | 0.1–1.0% |
| magnesium | 0.1–1.0% |
| potassium | 0.1–1.0% |
| sodium | 0.1–1.0% |
| sulfur | 0.1–1.0% |

The above composition is intended only to be a representative composition, and the absence of one or more of listed items, or the presence of additional unlisted items, is not deemed to limit the present invention. Moreover, the percentages of the various components will also vary from batch to batch, and vary with the ingredients and yeasts used. Therefore, it is contemplated, for example, that BCS may have between about 5% and about 25% by weight of protein, or even between about 15% and about 50%. The above specified ranges are merely exemplary and are not intended to limit the scope of the invention.

Manufactured BCS

BCS are manufactured by the mixing, either in liquid or solid form, all of the components of, for example, BCS obtained from any of the above-identified processes. All of the components of BCS prepared by these processes are commercially available. Components are prepared separately and mixed together to form manufactured BCS of the invention. Variations in a composition can also be easily manufactured and tested as appropriate by one of ordinary skill in the art for applicability for a particular use. For example, manufactured BCS with a decreased fat content can be more useful in the aircraft industry where accumulated crude fat may harm aircraft parts. However, higher protein content may be desirable in agriculture to prevent the accumulation of damaging amounts of snow on plants while providing large amounts of usable nitrogen as a fertilizer that will be available for the growing season.

Typically, manufactured BCS can be formed by combining of one of more of the following components: carbohydrates, protein, fat, crude fiber, calcium, phosphorus, magnesium, potassium, sodium, and sulfur in concentrations similar to the amounts provided above or in amounts that can be empirically tested by one of ordinary skill in the art.

Modified BCS

BCS obtained from milling or manufacturing are modified by the addition or removal of one or more components. For example, BCS may be modified by removal of iron. Iron-depleted BCS are useful in instances where the addition of iron is undesirable such as in and around airports. Iron is easily removed by applying a magnetic force to a BCS composition such that iron, both in particulate form and as molecular iron, will be attracted to the magnet. Once attracted to the magnet, iron is easily removed by removing the magnet. Alternatively, substantially all of the metals may be removed. Alternatively, protein can be removed by the addition of appropriate proteases to digest protein into its chemical constituents such as carbon-based small molecules, ammonia and water. Similarly, crude fat can be digested or simply treated with a mild detergent to break any aggregates. These and many other methods to modified BCS can be performed using the disclosures provided herein by one of ordinary skill in the art.

BCS Coatings

A mixture of 50% BCS and 50% water is sprayed on any one or more of the following components: sodium chloride, calcium chloride, potassium chloride, magnesium chloride, calcium magnesium acetate urea, sand, gravel, cinders, sawdust, and manufactured grit. Thereafter the sprayed components are dried in a drum oven or other drying means. The dried, BCS-coated composition is applied as a deicing composition.

Dried BCS

A mixture of BCS and water is dried in a drum oven or other drying means until the moisture content falls below about 10%, or lower. The dried BCS are applied as a deicing composition. Dried BCS can also be added to other compositions to function as an anti-freeze. The dried BCS may also be rehydrated with water prior to application as a deicing composition. For example, the dried BCS may be rehydrated with water such that the solution contains greater than about 5% of water.

BCS as a Plant Protector

A mixture of BCS and water is spayed on plants to reduce or prevent the accumulation of snow and ice thereon, which mixture also acts as a fertilizer and is not harmful to plants or animals that may be in the area. Plant growth is encouraged in the growing season with the presence of the BCS which may have degraded or fermented over time thereby making the chemical components of the solubles more readily available to the plant cells. Accordingly, there is no need to remove the compositions from the area as the compositions as well as its components are not harmful. One application of BCS in this fashion that works especially well is for garlic plants.

BCS Mixed with Chloride Salts

A municipality mixed approximately ⅓ sodium chloride with ⅔ sand and added approximately 5% by weight of BCS. The resulting mixture proved more effective than a comparable mixture of salt and sand alone, thus, allowing the municipality to reduce its total annual usage of salt by approximately 25–40%. The resulting mixture can be applied using conventional truck-mounted sand spreader hoppers. The resulting mixture also works at lower temperatures than salt alone.

Another municipality mixed approximately 97% chloride salts with approximately 3% BCS. The resulting mixture proved more effective than salt alone, melting more ice and snow during a fixed period of time, and melting ice and snow at lower temperatures, than the salts working alone.

Advantages

Advantages of the composition according to the present invention include the following:

1) The composition of the present invention is neither overly corrosive nor environmentally unacceptable. This is a significant advantage over known compositions which damage vehicles, road ways, and the surrounding environment.

2) A 50% BCS soluble-50% water composition of the present invention has a freezing point below 10° F. It is free flowing at +5° F., and can be easily sprayed using conventional spraying equipment upon road surfaces or accumulated ice or snow at ambient temperatures. The composition can also be heated before its application to allow spray application at lower temperatures.

3) The composition can be applied in comparatively small amounts because once applied to the road surface, the composition of the present invention tends to remain in place and is not easily blown away by the wind or by the action of passing traffic, and the composition tends to prevent the adherence of snow and ice to the surfaces upon which it is applied.

4) The composition can be applied during any prevailing temperature and/or prior to impending snow and ice storms.

5) The composition can easily be applied to the roadways with uniformity using readily available equipment without any special training for the application crews.

6) The composition can be applied in the form of a solution, which allows for quick and even application by vehicles, even at speeds of 35 mph or more.

7) The composition is a low grade, low price industrial by-product available in large quantities in many of the states located in the Snow Belt. Its production in potential market areas will help reduce transportation costs.

8) The composition is a renewable agricultural by-product, and its commercial usage will help support U.S. farmers and the agricultural industry.

9) The composition of the present invention is biodegradable, and yet has a low biochemical oxygen demand (BOD). The BOD of a substance is a unit-less number that represents the ratio of oxygen utilized (in lbs.) per pound of said substance. The BOD in effect represents the metabolic needs of aerobic microorganisms in organicly rich matter. Most known deicers are not bio-degradable (and hence have a BOD of 0)—instead, they accumulate and become poisonous to the environment. One known deicer which is biodegradable is calcium magnesium acetate (CMA), but the present invention has a substantially lower BOD than does CMA.

10) The composition of the present invention can be cost effectively utilized by airports to prevent the accumulation of snow and ice on runways and taxiways, hence eliminating or further reducing the need for other chemical deicers which are known to be environmentally unfriendly and potentially or actually damaging to aircraft parts including component parts of aircraft engines.

11) The composition of the present invention can be used to treat plants in preparation of a snow or ice storm to help reduce the accumulation of snow or ice on the plants. Deicing compositions of the invention contain nutrients such as phosphorous and nitrogen in chemical forms available for use by the metabolic processes of the plant or convertible by, for example, nitrogen fixation into useful forms of nitrogen by microorganisms that exist in the soil.

Summary of Testing

Further details of the present invention are to be found in the following test results without limiting the scope of protection to the specified mixture of composition of the present invention.

Test 1

At a temperature of 10° F., a composition of the present invention comprised of 99% of BCS (approximately 48% solubles) and 1% of a surfactant was applied full strength to a 100 ton pile of #1 Crushed Stone. Approximately 10 gallons of the composition of the present invention was sprayed on one side of the pile. Prior to the test, the pile of stone contained frost to a depth of 25 inches. After 24 hours, the composition had penetrated completely through the layer of frost and each stone particle was separated, moving easily when probed with a shovel.

Test 2

Test 1 above was repeated the following day on a pile of #2 Crushed Stone, with similar results. At night the temperature dropped to 6 degrees (F), and the following day, tile temperature rose to 22 degrees (F). Where the product was applied, the stone material was free flowing. Where the product was not applied, the pile was frozen solid.

Test 3

At a temperature of 22 degrees (F) a composition of the present invention comprised 99% of a byproduct concentrate of the beer brewing industry (BCS with approximately 48% solubles) and 1% of a surfactant was sprayed on a pile of road salt. Prior to application, the salt was beginning to form large, hard clumps. The following day, the clumps had completely broken up and the salt was easily stirred and shoveled. The composition of the present invention had no detrimental or dissolving effect on the salt grains and had coated each grain of salt.

Test 4

At a temperature of 22 degrees (F) a composition of the present invention was sprayed on an 800 ton pile of manufactured road grit. Prior to application, the grit was encased with a layer of frost about 12 inches deep. The first application penetrated the pile to a depth of about 6 inches. The following day, a second application was made, which penetrated through the frost and made the pile usable without frost clumps.

Test 5

A 2000 ton sand/salt pile was treated with a composition of the present invention. The pile surface was frozen to a depth of about 12 inches, and contained unbreakable frozen ice clumps. Approximately 1000 gallons of composition was sprayed on the surface of the pile and on the frozen clumps. After 24 hours, the pile was free of frost and ice, and was usable for road application. Due to the ability of the composition to break up clumps and dissolve ice, the pile was used and satisfactory de-icing results were obtained with 20% less material than would have been required had only sand and salt been used.

Test 6

For the tests, BCS from a brewery, concentrated at approximately 50% by weight of dry substance, was applied at an external temperature of 23° F. to an approximately one (1) inch sheet of hard packed snow of approximately 250 square yards without any additives. For comparison, a readily recognized and available mixture of industrial salts and sand was applied to a second one (1) inch thick sheet of hard packed snow of approximately 250 square yards in an adjacent location. Another application of industrial salt with no additional substances mixed in was applied to a third one (1) inch thick sheet of hard packed snow of approximately 250 square yards in another adjacent location. It was found that the melting effect of the BCS composition having a dry substance content of 50% by weight was superior to that of the mixture of salt and sand, and to that of the salt alone, both in duration of effect and the strength of activity. The BCS composition exhibited complete melting of the hard packed snow after only about one half hour, while neither of the areas covered by the mixture of salt and sand nor the salt alone was free of snow even after a full hour. Moreover, the 50% concentration of the present invention is active even at temperatures as low as 10° F., while the melting effect of the salt and sand mixture and of the salt alone slows and completely stops at approximately 20° F.

Additional testing has been performed to evaluate the composition of the present invention for corrosiveness, biochemical degradation demands, and efficacy at varying temperatures. The results are discussed below.

Corrosion Tests

Mild steel coupons were immersed in various concentrations of BCS. After four months of immersion, the bolts showed virtually no evidence of rust or oxidation. Laboratory corrosion tests measured the corrosive effect at less than about 0.5 mil per year (MPY), which is much lower than many conventional chemical deicing agents, and which is well below the requirements of most states. The foregoing corrosion tests were conducted in accordance with National Association of Corrosion Engineers (NACE) Standard TM-01-69 (1976 rev.), as modified by the Washington State Department of Transportation (WSDOT). For comparison, WSDOT specifies that a substance must have a MPY of 13.28 or less to be acceptable. Sodium Chloride typically has a MPY around 44, when measured in accordance with NACE Standard TM-01-69 (1976 rev.).

Mild steel coupons were sprayed regularly with various concentrations of BCS. After four months of regular spraying, the bolts showed virtually no evidence of rust or oxidation. Instead of corroding, the bolts appeared to have been sealed by a layer of dried BCS, which coating appeared to be protective rather than destructive.

The following tables summarizes some of the test results:

| MATERIAL | CORROSION (mils per year - MPY) |
|---|---|
| Mild Steel | 0.50 |
| Stainless Steel | None detectable |
| Aluminum | None detectable |

In comparison, mild steel bolts subjected to similar test conditions as described above, but utilizing mixtures of water and with 5% concentrations of various chloride salts, exhibited extreme corrosion, rust, and deterioration.

Environmental Tests

Tests were performed to measure the biological oxygen demand (in pounds) per pound of various mixtures of the composition of the present invention. Again, the BOD represents the metabolic needs of aerobic microorganisms in organic matter. Results appear below:

| CONCENTRATION (by weight) | BOD DEMAND (lb. of $O_2$ per lb. of material) |
|---|---|
| 25% solids | 0.13–0.17 |
| 50% solids | 0.28–0.32 |

The composition of the present invention is currently used as a low grade animal feed additive. Because it is widely accepted by the livestock industries and is not known to leave deleterious traces of any harmful substances in the animals being fed, it is believed to be completely safe to the environment and safe to handle as well.

Freezing, Deicing, and Anti-Icing Tests

The following results describe the consistency of a mixture of the present invention concentrated at 48% solubles:

| TEMPERATURE (° F.) | DESCRIPTION |
|---|---|
| +30 | 30 weight motor oil |
| +20 | 30 weight motor oil |
| +10 | Thick Molasses |
| 0 | Thick, Putty-like |

The following table summarizes the freezing data and provides quantitative information on a typical mill run BCS solution containing approximately 50% solubles:

| Sample No. | Percent Water Added | Percent Solids | Freezing Point (° F.) | Spec. Grav. | Visc. SSU @70° C. | Visc. SSU @32° F. |
|---|---|---|---|---|---|---|
| 1 | 0.0 | 48 | +6 | 1.24 | 1600 | 4000 |
| 2 | 2.1 | 47 | +8 | 1.234 | 1350 | 3700 |
| 3 | 4.2 | 46 | +8 | 1.228 | 980 | 2700 |
| 4 | 16.7 | 40 | +12 | 1.192 | 320 | 1400 |
| 5 | 37.5 | 30 | +18 | 1.138 | 100 | 200 |
| 6 | 58.3 | 20 | +22 | 1.088 | 52 | 60 |
| 7 | 79.2 | 10 | +28 | 1.042 | 36 | 36 |
| 8 | 89.6 | 5 | +32 | 1.021 | 35 | 35 |

While the melting effect of chloride salts is limited (reduced effectiveness below 30° F., and almost completely ineffective below approximately 20° F.), the melting effect of the composition of the present invention, as demonstrated by the tables above, is active even at temperatures as low as 10° F.

Other embodiments and uses of the invention will be apparent to those skilled in the art from consideration of the specific practice of the invention disclosed herein. All documents disclosed herein, including U.S. Pat. No. 5,612,072 (issued Dec. 21, 1992, to Lommi et al.), are specifically incorporated by reference. The specification and examples should be considered exemplary only with the true scope and spirit of the invention indicated by the following claims.

What is claimed is:

1. A deicing composition comprising an effective amount of brewers' condensed solubles for inhibiting the accumulation of snow and ice.

2. The deicing composition of claim 1 wherein the brewers' condensed solubles contain from about 15% to about 50% by weight of crude protein.

3. The deicing composition of claim 1 wherein the brewers' condensed solubles are produced by fermenting wort to make a beer.

4. The deicing composition of claim 3 wherein the wort is made from a corn.

5. The deicing composition of claim 3 wherein the wort is made from a wheat.

6. The deicing composition of claim 3 wherein the wort is made from a barley.

7. The deicing composition of claim 1 wherein the brewers' condensed solubles contain at least one component selected from the group consisting of carbohydrates, protein, fat, crude fiber, calcium, phosphorus, magnesium, potassium, sodium, and sulfur.

8. The deicing composition of claim 1 which contains less than about 5% by weight of water.

9. The deicing composition of claim 1 which contains greater than about 50% by weight of water.

10. The deicing composition of claim 1 which contains a skid-reducing component.

11. The deicing composition of claim 10 wherein the skid-reducing component is selected from the group consisting of sand, gravel, cinders, sawdust, manufactured grit and combinations thereof.

12. The deicing composition of claim 1 further comprising at least one component selected from the group consisting of sodium chloride, calcium chloride, potassium chloride, magnesium chloride, calcium magnesium acetate, and urea.

13. The deicing composition of claim 1 wherein substantially all proteins have been removed.

14. A method for inhibiting the accumulation of freezing precipitation on a surface comprising applying a composition containing an effective inhibiting amount of brewers' condensed solubles to said surface.

15. The method of claim 14, wherein said surface is a plant surface.

16. The method of claim 14 wherein the surface is a road surface and the composition is applied to said surface at from about 20 to about 60 gallons per lane mile.

17. The method of claim 14 wherein the composition further contains a skid-reducing component.

18. The method of claim 17 wherein the skid-reducing component is selected from the group consisting of sand, gravel, cinders, sawdust, manufactured grit and combinations thereof.

19. A method for inhibiting corrosion of a surface exposed to a corrosive substance comprising applying a composition containing brewers' condensed solubles to said surface.

20. The method of claim 19 wherein the corrosive substance is selected from the group consisting of sodium chloride, calcium chloride, potassium chloride, magnesium chloride and combinations thereof.

21. The method of claim 19 wherein the brewers' condensed solubles comprise from about 5% to about 75% by weight of said composition.

22. The method of claim 19 wherein the brewers' condensed solubles are dried to less than about 5% by weight of water.

23. The method of claim 22 wherein the brewers' condensed solubles are rehydrated to greater than 5% by weight of water before application to a surface.

24. The method of claim 19 wherein the brewers' condensed solubles are mixed with a skid-reducing component.

25. A composition for inhibiting the accumulation of snow and ice comprising from about 2 to 50% by weight of brewers' condensed solubles and from about 98 to 50% by weight of water.

* * * * *